United States Patent [19]
Sun et al.

[11] Patent Number: 5,325,581
[45] Date of Patent: Jul. 5, 1994

[54] CLAMPING AND DRILLING DEVICE FOR A CURVED PLATE

[75] Inventors: Chuan-Chia Sun, Kaohsiung Hsien; Yu-An Hsieh, Kaohsiung; Ching-Fu Lin, Kaohsiung Hsien, all of Taiwan

[73] Assignee: Metal Industries Research & Development Centre, Kaohsiung, Taiwan

[21] Appl. No.: 107,225

[22] Filed: Aug. 16, 1993

[51] Int. Cl.⁵ .......................... B23Q 3/06; B23B 39/16
[52] U.S. Cl. ........................................ 29/563; 29/564; 269/266; 269/909; 408/44
[58] Field of Search .............. 29/563, 564, 38 C, 252; 408/42, 44; 409/163, 158, 219, 221, 220; 269/909, 266

[56] References Cited

U.S. PATENT DOCUMENTS

| | | | |
|---|---|---|---|
| 2,953,069 | 9/1960 | Smith | 409/163 |
| 3,797,957 | 3/1974 | Hoglund | 29/38 C X |
| 3,833,312 | 9/1974 | Miles et al. | 29/563 X |
| 4,033,569 | 7/1977 | Dunn | 269/266 X |
| 4,233,893 | 11/1980 | Pringle | 269/909 X |
| 4,454,645 | 6/1984 | Schisser | 29/563 |
| 5,177,849 | 1/1993 | Johnson | 29/252 |

FOREIGN PATENT DOCUMENTS

| | | | |
|---|---|---|---|
| 232344 | 3/1964 | Australia | 29/563 |
| 13275 | 2/1977 | Japan | 269/266 |
| 650786 | 3/1979 | U.S.S.R. | 29/564 |
| 1189643 | 11/1985 | U.S.S.R. | 269/909 |

*Primary Examiner*—William Briggs
*Attorney, Agent, or Firm*—Darby & Darby

[57] ABSTRACT

The device includes a clamping assembly which has a stationary upright post with upper and lower casings coaxially mounted to the upright post, a threaded shaft to adjust a vertical height of the upper and lower casings, a drilling assembly which is adjacent to the clamping assembly and which has first and second drilling bits that respectively extends toward an axis of the upright post in a parallel manner and a worm mechanism for adjusting a vertical height between the two drilling bits and an index apparatus which can rotate the clamping assembly to a predetermined angle relative to the drilling assembly. The upper and lower casings have radially movable pieces with clamping members thereon. A synchronous moving unit moves the movable pieces relative to the upright post to define a distance which is equal to a radius of curvature of a curved plate that is to be clamped and drilled by the device.

4 Claims, 9 Drawing Sheets

CLAMPING AND DRILLING DEVICE FOR A CURVED PLATE

BACKGROUND OF THE INVENTION

1. Field of the Invention

The invention relates to a clamping and drilling device, more particularly to a clamping and drilling device which is capable of clamping and drilling curved plates that have different widths and different radii of curvature.

2. Description of the Related Art

After the formation of a curved plate which is to be used as a lining plate in the manufacture of a brake of an automobile, holes with a particular pattern are drilled through the curved plate in order to permit the passage of rivets therethrough. The curved plate is clamped securely by a conventional clamping assembly while a conventional drilling apparatus performs a drilling operation thereon. The width and radius of curvature of a curved plate that is used to construct a brake shoe of a vehicle are different from another curved plate that is used to construct another brake shoe. Therefore, different kinds of conventional clamping assemblies must be constructed for different curved plates, thereby resulting in a relatively high manufacturing cost.

SUMMARY OF THE INVENTION

The main objective of the present invention is to provide a clamping and drilling device which can clamp and drill curved plates of different widths and different radii of curvature so that the cost of constructing different kinds of clamping and drilling devices can be eliminated.

Accordingly, the clamping and drilling device of the present invention includes a machine body, an indexing apparatus which has an index plate mounted rotatably on the machine body, a clamping assembly disposed on the index plate and a drilling assembly disposed on the machine body adjacent to the clamping assembly. The clamping assembly includes an upright post fixed to the index plate, a lateral pivot seat fixed on the upright post between the index plate and a top of the upright post, a first engaging unit and upper and lower circular hollow casings which are mounted coaxially to the upright post. Each of the upper and lower hollow casings has a covering plate which faces the other one of the upper and lower casings. The lower hollow casing is fixed to the index plate. The upper casing has a second engaging unit which engages the first engaging unit of the upright post so as to prevent the upper hollow casing from rotating relative to the upright post and so as to permit the upper hollow casings to travel axially along the upright post. A threaded hole is formed through the second engaging unit and extends in a direction parallel to the upright post. A threaded shaft is threaded to the threaded hole. A lower end of the threaded shaft is journalled to the lateral pivot seat of the upright post. Therefore, the upper hollow casing is retained adjustably on the upright post at a desired height relative to the lower hollow casing. The desired height is adjusted by rotating the threaded rod in accordance with a width of the curved plate to be drilled. Each of the upper and lower casings has an abutting plate which is fixed perpendicularly on the respective covering plate and which extends radially thereon, a radial groove and an elongated movable piece provided slidably in the radial groove. The elongated movable piece is provided with a clamping means and a driving means to operate the clamping means. The clamping assembly further includes means for moving synchronously the elongated movable pieces along the radial grooves in order to space the movable pieces at a desired distance relative to the upright post, which desired distance is equal to the radius of curvature of the curved plate. The drilling assembly includes an upright holding member that has a first drilling bit which extends toward an axis of the upright post, a second drilling bit which is disposed right below and parallel to the first drilling bit and an adjusting means for altering a vertical height between the first and second drilling bits to correspond with the holes to be formed on the curved plate.

Since the present device can clamp and drill curved plates of different widths and different radii of curvature, there is no need to construct different clamping and drilling devices as in the prior art, thereby consequently reducing the manufacturing cost.

BRIEF DESCRIPTION OF THE DRAWINGS

Other features and advantages of the present invention will become more apparent in the following detailed description of the preferred embodiment with reference to the accompanying drawings, in which:

FIG. 7 (A) is a perspective view of the drilling assembly employed in the present device, a portion of which is cut away to illustrate interior the thereof;

FIG. 7 (B) illustrates a vertical adjusting means employed in the drilling assembly of FIG. 7(A);

DETAILED DESCRIPTION OF THE PREFERRED EMBODIMENT

Figure 1:
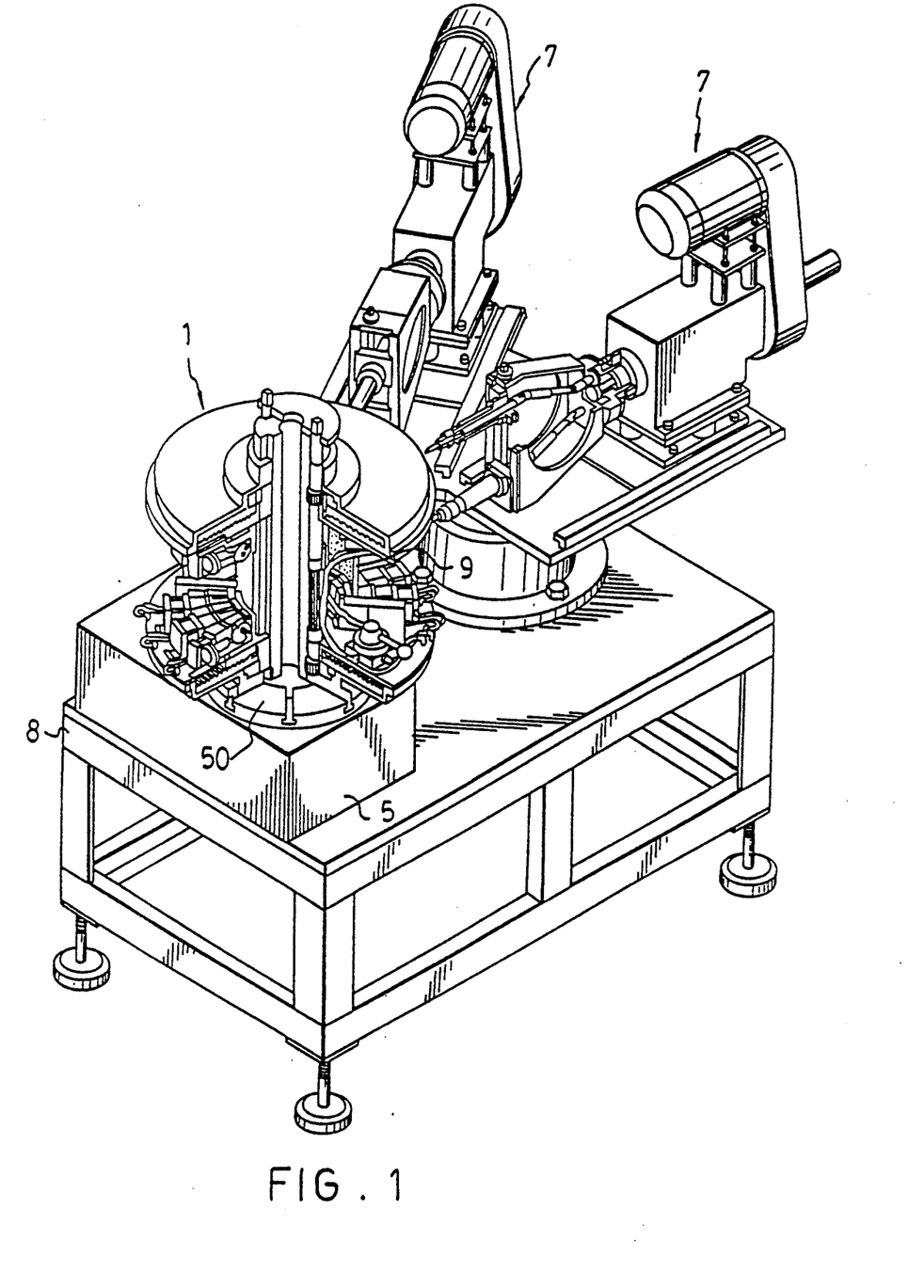
FIG. 1 is a perspective view of a clamping and drilling device of the present invention, a portion of which is cut away to illustrate the interior thereof.
Figure 2:
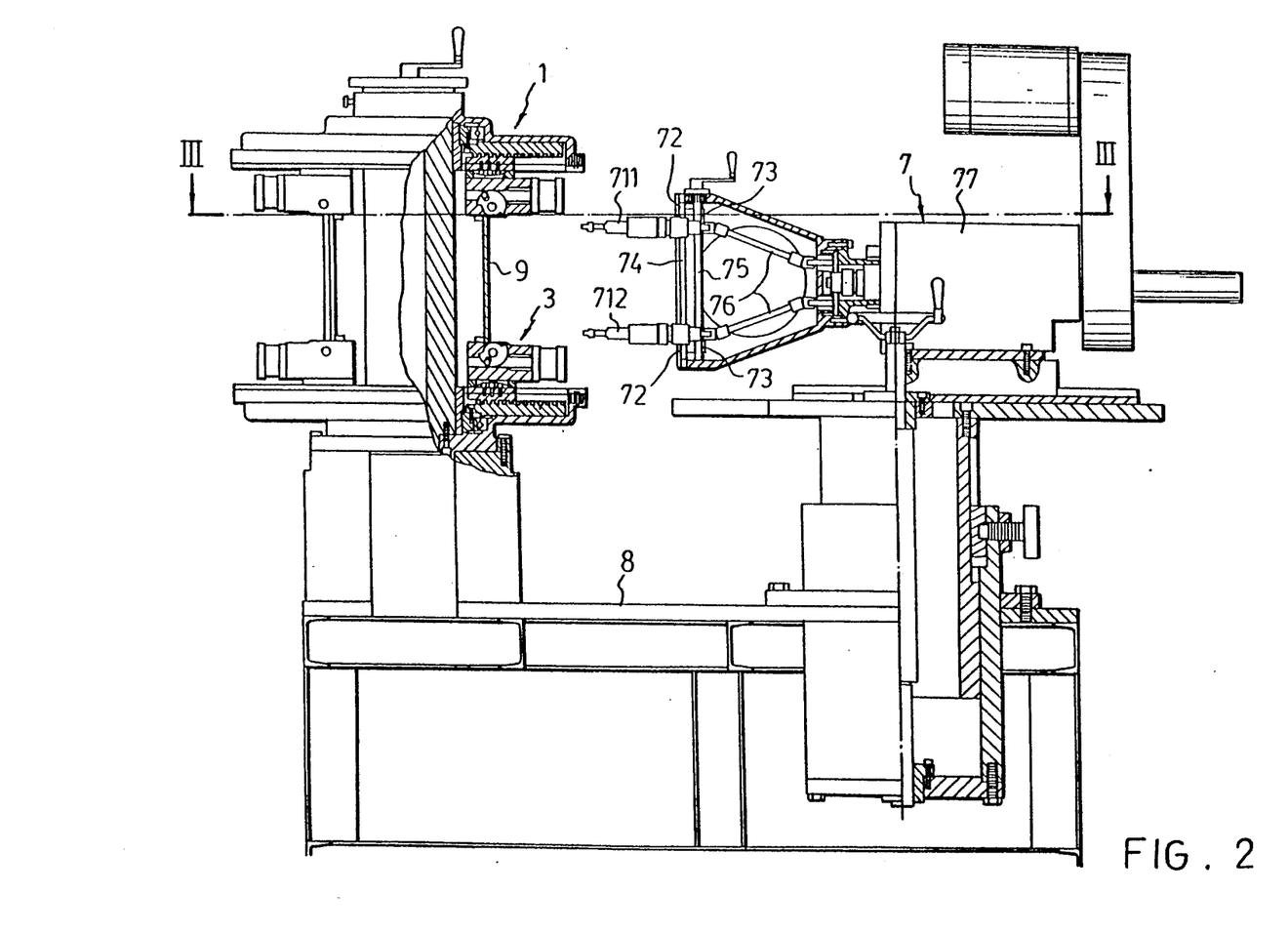
FIG. 2 is a side view the clamping and drilling device shown in FIG. 1.

FIGS. 1 and 2 respectively show a perspective view and a side view of a clamping and drilling device of the present invention. As best illustrated, the present device includes a machine body 8, a clamping assembly 1 and two drilling assemblies 7 adjacent to the clamping assembly 1.

Figure 3:
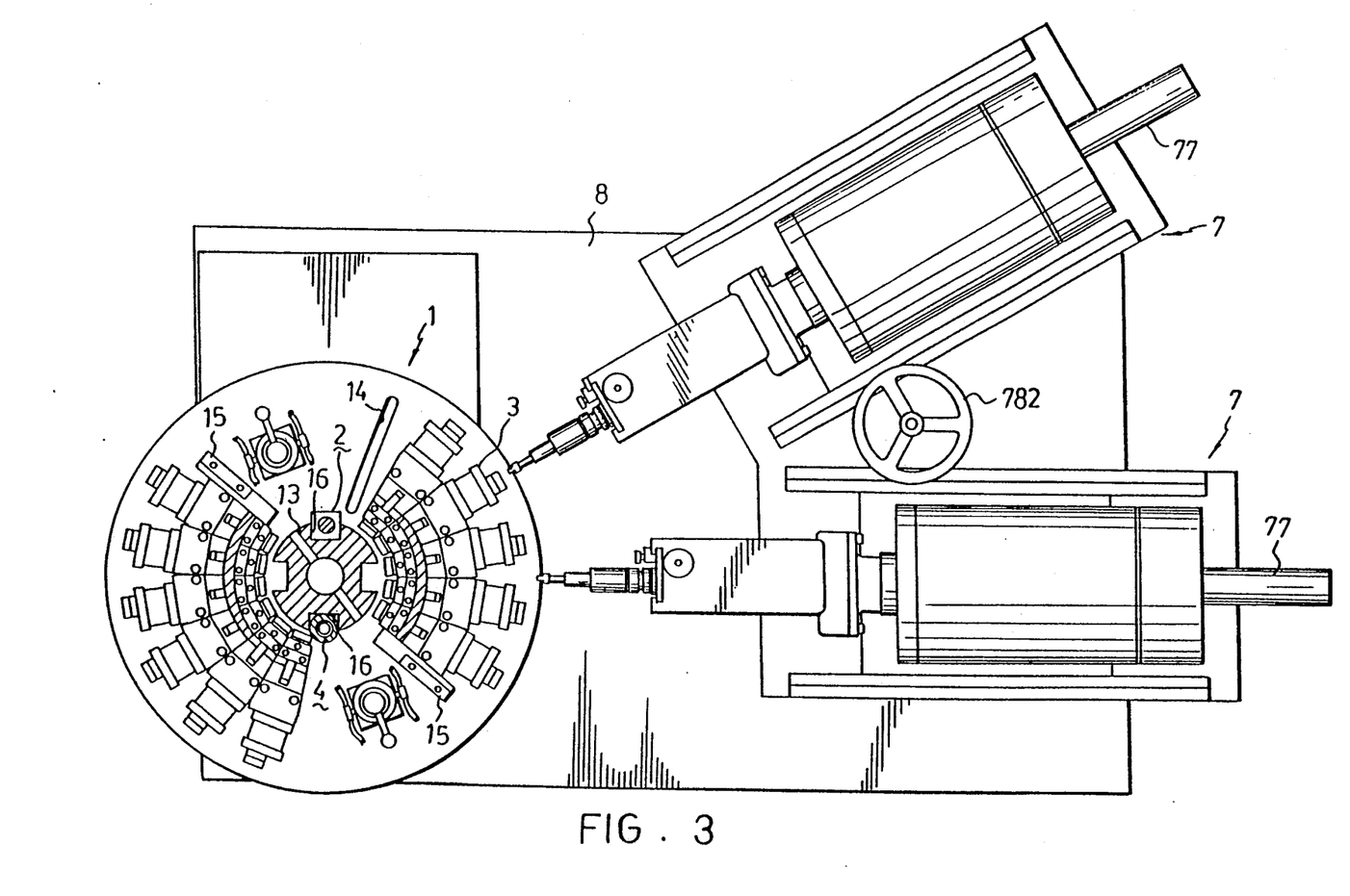
FIG. 3 is a top view of the clamping and drilling device of FIG. 2 taken along the line III—III.
Figure 4:
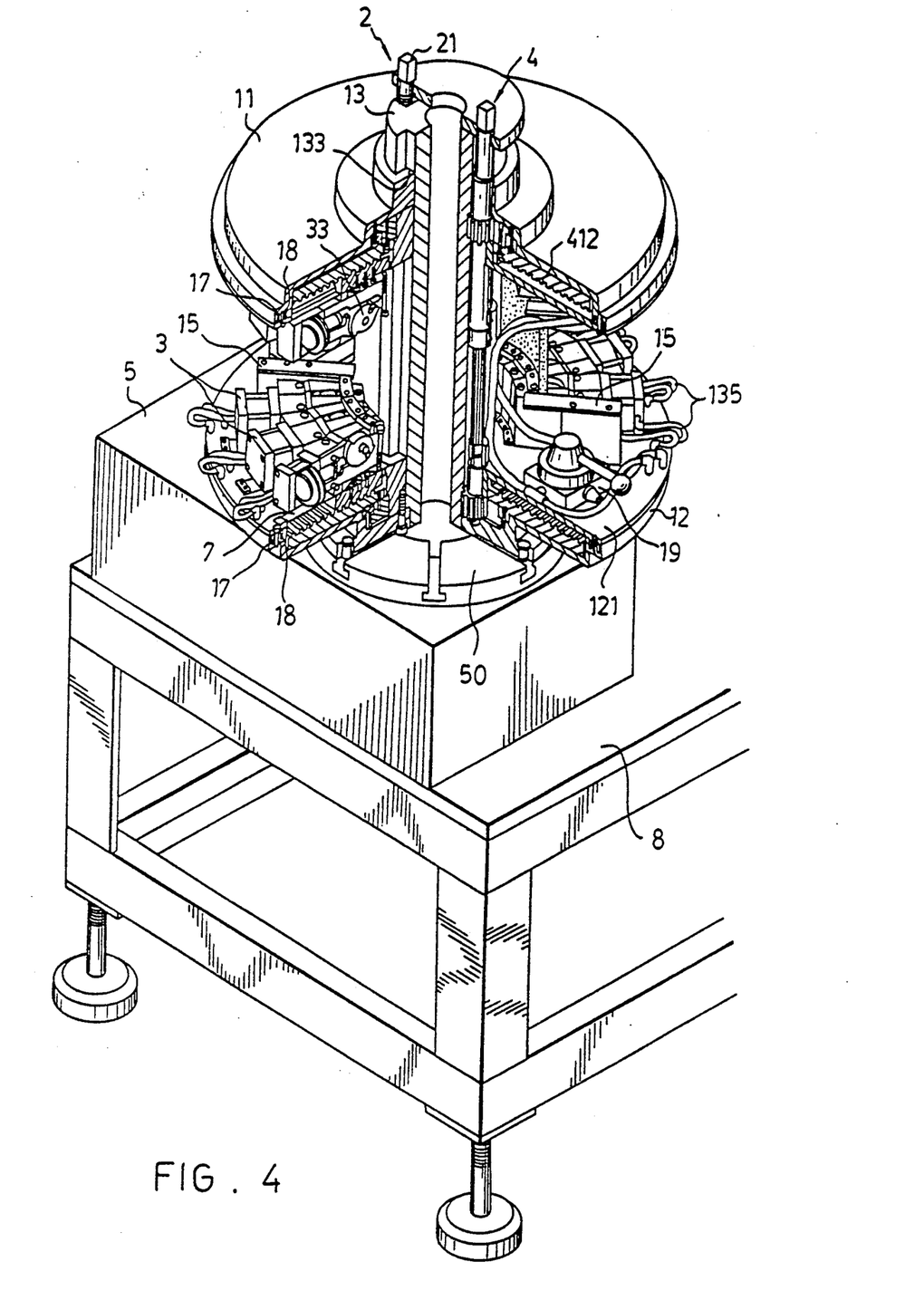
FIG. 4 is a perspective view of a clamping assembly of the present device, a portion of the clamping assembly is cut away to illustrate the interior thereof.
Figure 5:
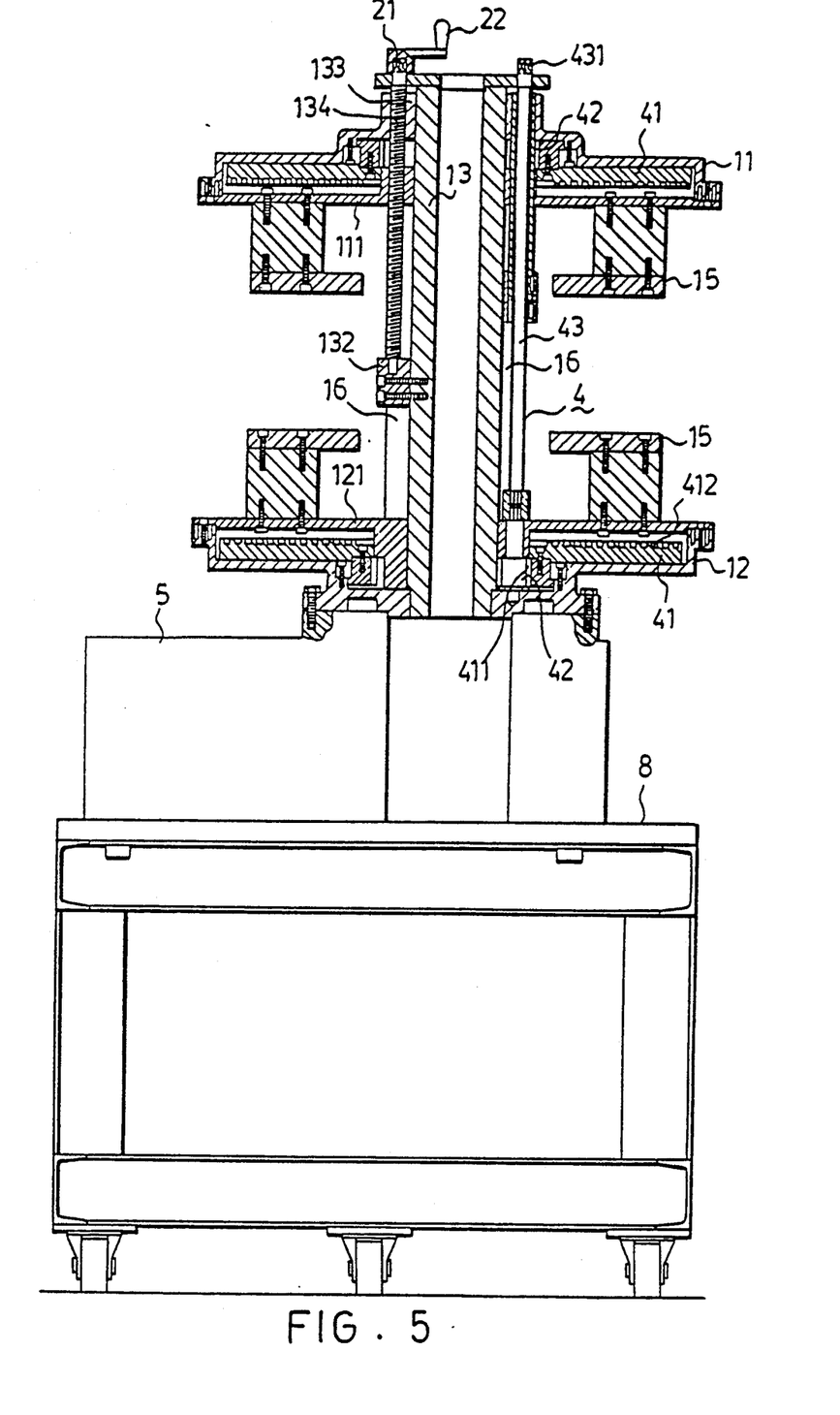
FIG. 5 is a cross-sectional view of the clamping assembly employed in the present device.

Referring to FIGS. 3, 4 and 5, the device also includes an indexing apparatus 5 which is mounted on the machine body 8 and which has an index plate 50 disposed rotatably thereon. Since the construction and the use of the index apparatus is well known to one skilled in the art, a detailed description of the index apparatus will be omitted herein. The clamping assembly 1 includes an upright post 13 that has a lower end fixed to the index plate 50 and a top end provided with a circular holding member 4, a first engaging unit in the form of two axial grooves 16 formed on an external surface of the upright post 13, a lateral pivot seat 132 fixed in one of the axial grooves 16 between the index plate 50 and the circular holding member 4, and upper and lower circular hollow casings 11, 12 mounted coaxially to the upright post 13.

Each of the upper and lower circular hollow casings 11, 12 includes a covering plate 111, 121 which faces the other one of the covering plates 111, 121 and which has two vertical abutting plates 15 disposed diametrically thereon, and a plurality of radial grooves 14. The radial grooves 14 are angularly and equally spaced from one another. In the present preferred embodiment, the clamping assembly 1 includes two sets of clamping units which are divided by the vertical abutting plates 15. Therefore, two curved plates can be simultaneously clamped by the clamping assembly 1.

The lower hollow casing 12 is fixed to the index plate 50. The upper hollow casing 11 includes a second engaging unit. In the present preferred embodiment, the second engaging unit is a rectangular projection 133 which extends into one of the axial grooves 16 and which has a threaded hole 134 formed through the rectangular projection 133 and parallel to the upright post 13. A threaded shaft 21 is threaded in the threaded hole 134. A lower end of the thread shaft 21 is journalled in the lateral pivot seat 132 while an upper end 22 of the former passes through the upper holding member 4. Thus, the upper casing 11 is retained on the upright post 13 at a desired height relative to the lower casing 12. The upper end 22 of the threaded shaft 21 has a rectangular cross section to facilitate rotation. When the threaded shaft 21 is rotated, the upper casing 11 will move along the upright post 13. The upper casing 11 is prevented from rotating relative to the upright post 13. The vertical height between the upper and lower casings 11, 12 can be adjusted in accordance with the width of a curved plate which is to be clamped between the upper and lower casings 11, 12 by rotating the threaded shaft 21.

Figure 6:
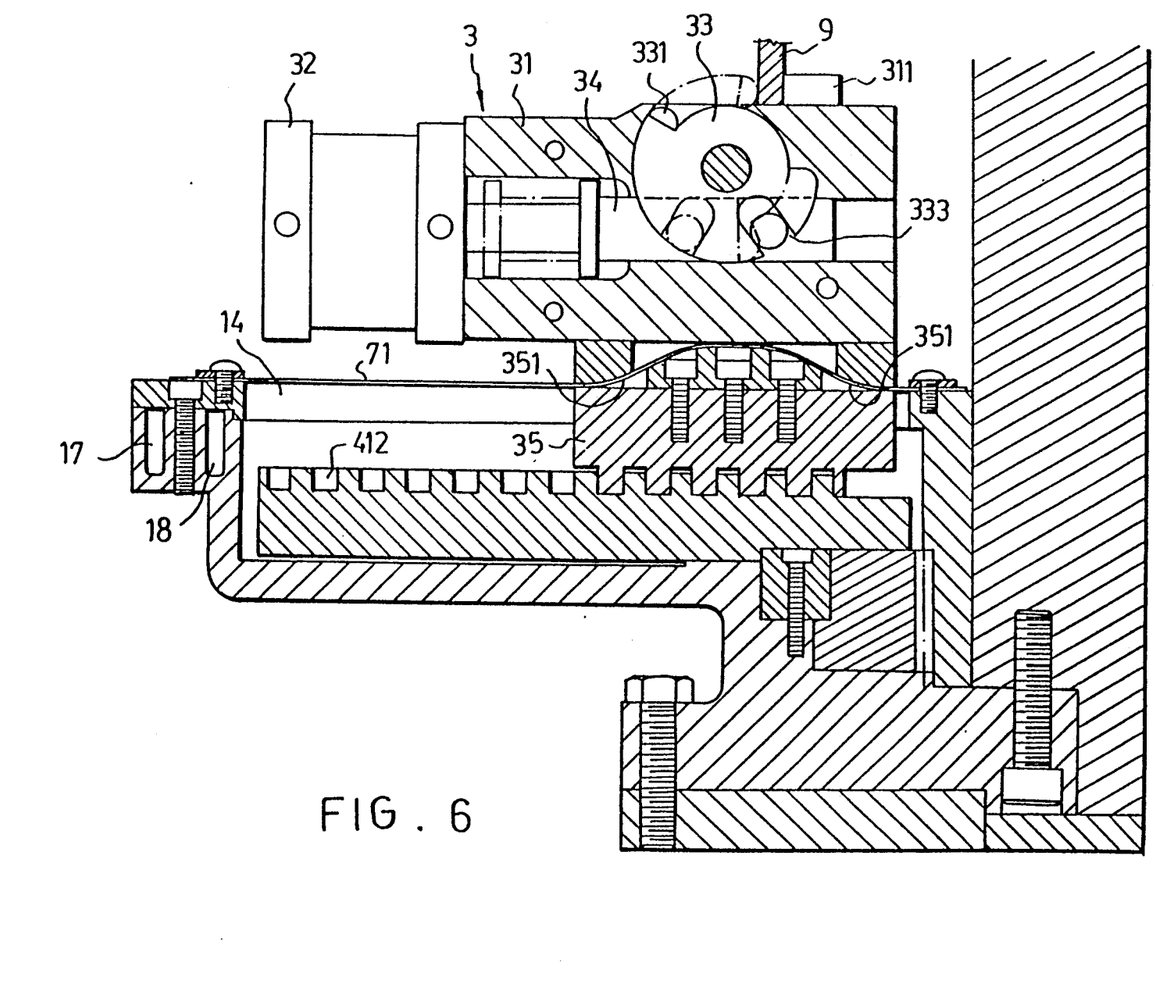
FIG. 6 is an enlarged side view of a clamp of the clamping assembly of FIG. 5.

A plurality of elongated movable pieces 3 are mounted slidably in the radial grooves of the covering plates 111, 121. Each of the elongated movable pieces 3 includes two clamping members, such as a curved face support 311 adjacent to the upright post 13 and a circular disc 33 that has a center point pivoted to the movable piece 3, and a driving means. The circular disc 33 has a cut-out formed along the periphery thereof, thereby defining a radial edge 331 adjacent to the curved face support 311 and a peripheral notch 333 which is spaced from the radial edge 331 by a given angular distance. The driving means includes a pneumatic cylinder 32 which has a piston arm 34 with a front end pivoted in the peripheral notch 333 by any suitable method and a rear end connected to the pneumatic cylinder 32 so that when the pneumatic cylinder 32 is actuated, the radial edge 331 will move to abut or move away from the curved plate 9 which is provided between the radial edge 331 and the curved face support 311.

Each of the upper and lower casings 11, 12 has a control member that includes two tubular members formed along the peripheral thereof and two switching valves 19 which are in turn connected to a pressurized air source (not shown). Each of the pneumatic cylinders 32 is connected to the switching valves 19 by means of the connecting tubes 135. Each of the tubular member defines an air passage which is connected to the switching valve 19. The switching valves 19 can be operated in order to actuate the air cylinder 32 of the movable pieces in the clamping unit synchronously so that the radial edges 331 of the circular discs 33 simultaneously abut against the curved face support 311. Thus the curved plate 9 is clamped firmly in each of the clamping units.

The clamping assembly further includes a synchronous adjusting means for moving the movable pieces along the radial grooves of the covering plates 111, 121. The adjusting means includes two annular rotary plates 41 respectively mounted in each of the upper and lower hollow casings 11, 12 and coaxially mounted on the upright post 13, two gear wheels 42 and a telescopic shaft 43. Each of the rotary plates 41 has a threaded portion 411 at an inner periphery of the same and which is meshed with the gear wheel 42, and a helical groove 412 formed on a surface thereof adjacent to the respective covering plate 111, 121. Each of the elongated movable pieces 3 has a toothed portion 35 which extends into the upper and lower casings 11, 12 through the respective covering plate 111, 121 and which meshes with the helical groove 412 of the rotary plate 41. The telescopic shaft 43 has two ends which extend into the upper and lower casings 11, 12 and connects securely the gear wheels 42.

Therefore, when the telescopic shaft 43 is rotated about its axis, the elongated movable pieces 3 move along the radial grooves of the covering plates 111, 121, thereby altering a distance between the movable pieces 3 and the upright post 13, which distance is equal to the radius of curvature of the curved plate to be clamped therein. The movable pieces 3 are connected to one another so as to form a combined curved face support of considerable size in order to support the curved plate which possesses a greatest radius of curvature that is substantially equal to the radius of the covering plates. The telescopic shaft 43 further permits sliding movement of the upper casing 11 axially along the upright post 13 when the threaded shaft 21 is rotated.

To clamp a curved plate with a radius of curvature that is smaller than the radius of the covering plate 111, 121, the movable pieces 3 can be moved closer toward the upright post 13 so as to complement with the radius of curvature of the curved plate 9. In use, the vertical height of the upper casing 11 relative to the lower casing 12 can be adjusted by turning the threaded shaft 21 in order to complement with the width of the curved plate 9. The curved plate 9 is placed between the combined curved face support 311 and the circular disc 33 such that one side edge of the curved plate 9 abuts against the vertical abutting plate 15. The circular disc 33 will clamp the curved plate 9 upon actuation of the pneumatic cylinder 32.

Figure 8:
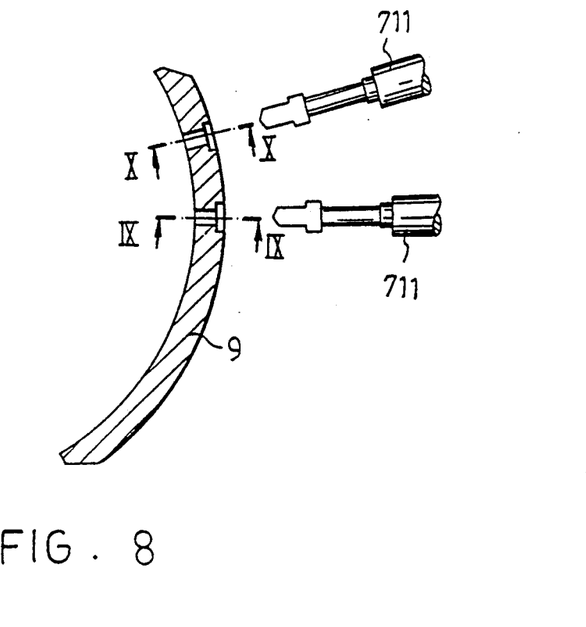
FIG. 8 shows the drilling assembly of the present device while performing a drilling operation on a curved plate.
Figure 9:
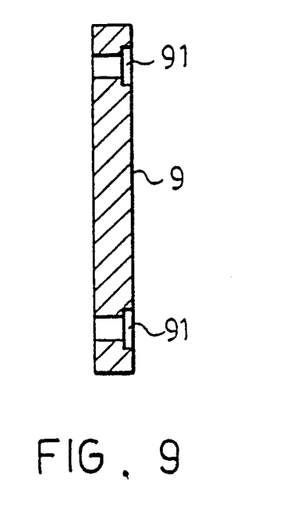
FIGS. 9 and 10 shows two curved plates with holes of different patterns which are performed by the present clamping and drilling device.
Figure 10:
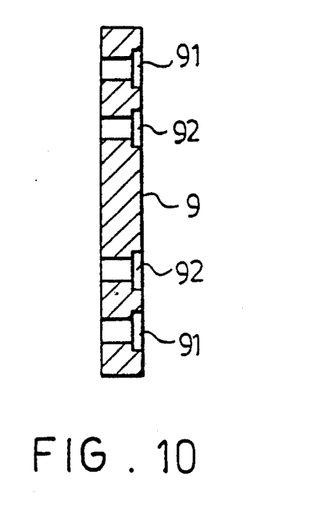

After performing drilling operation on the curved plate 9 which is clamped by a first clamping unit, as shown in FIG. 8, the indexing apparatus 5 rotates the index plate 50 to a predetermined angle relative to the drilling assembly 7. When rotated, the drilling assembly 7 can perform a drilling operation on a second curved plate which is clamped by the second clamping unit.

Figure 7A:
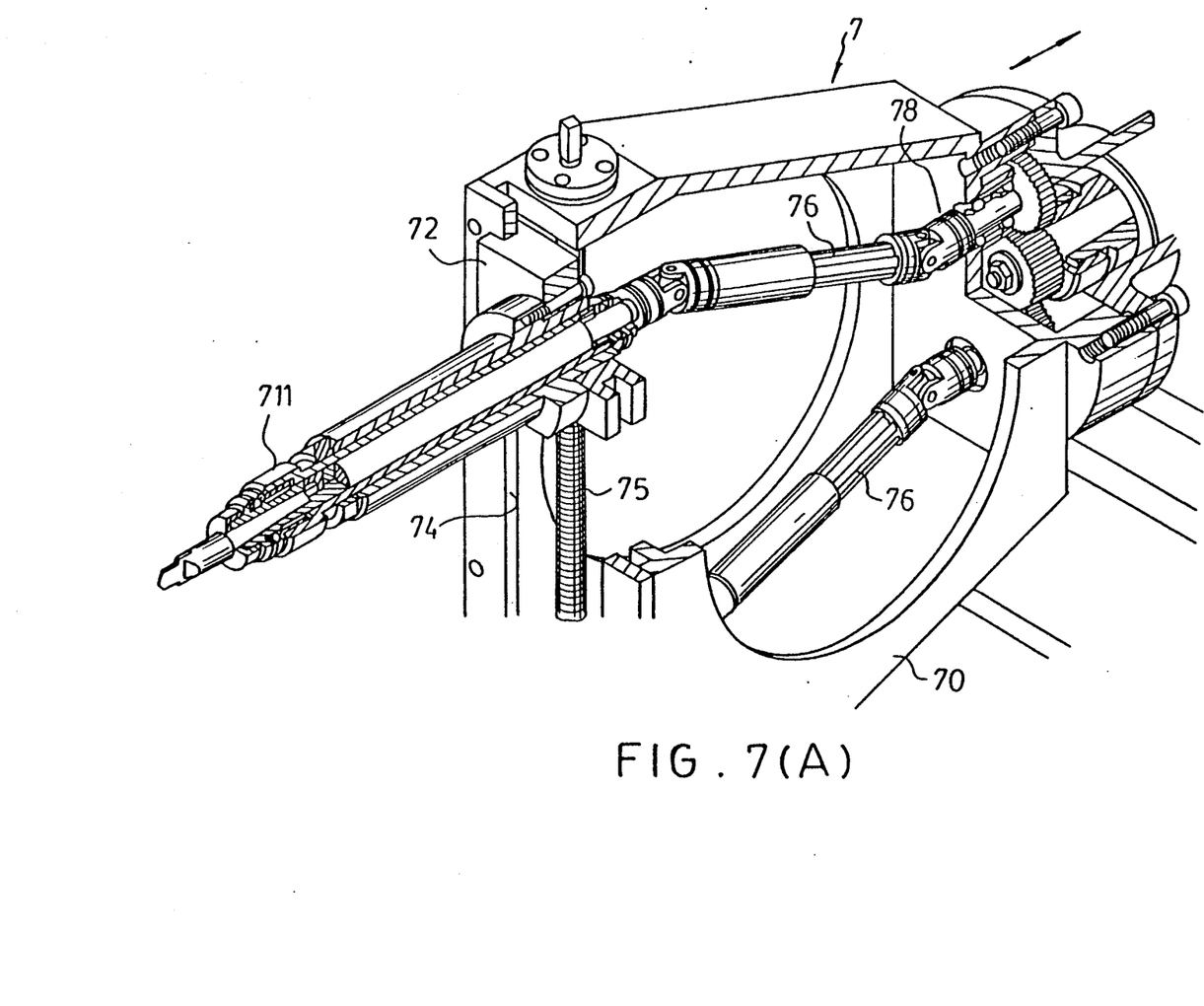
Figure 7B:
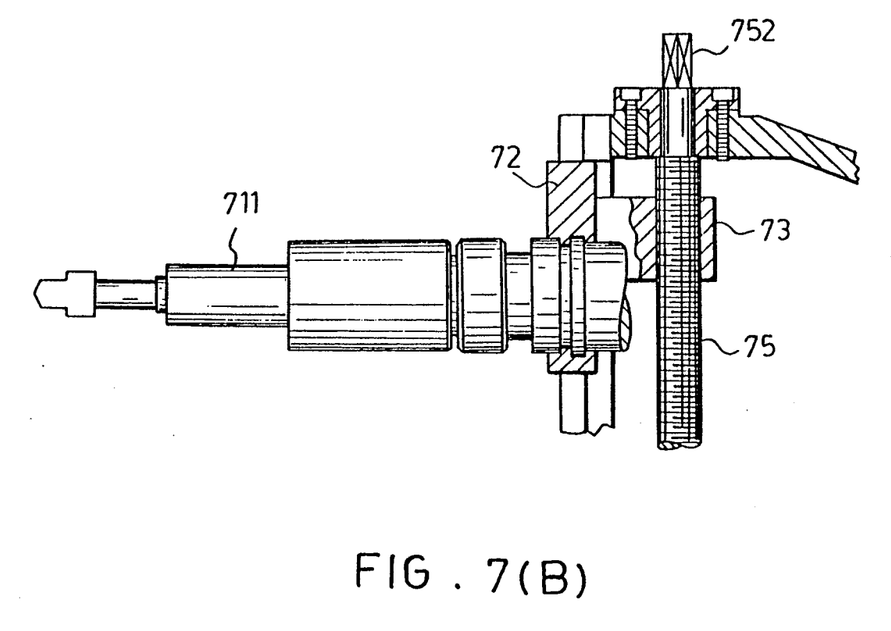

Referring to FIG. 7, the relative positions of two drilling assemblies 7 that are employed in the present device can be adjusted by rotating a wheel 782. Each of the drilling assemblies includes an upright holding member 70 that has a vertical guide channel 74 in which two retaining pieces 72 are slidably mounted, a first drilling bit 711 that extends through one of the retaining pieces toward an axis of the upright post 13, a second drilling bit 712 that extends through the remaining retaining pieces right below and parallel to the first drilling bit 711, and a worm 75 that is journalled through the upright holding member 70. Each of the retaining pieces 74 has a worm gear 73 with threads which turn oppositely to the threads formed on another worm gear. The worm gears 73 mesh with the worm 75. When the worm 75 is rotated, the retaining pieces 72 move toward or away from one another so as to adjust a vertical height between the two drilling bits 711, 712 in accordance with the size of the holes to be formed on the curved plate 9.

With regards to how the rear ends of the drilling bits 711, 712 are connected to the driving motor 77 via slip joints 76 and universal joints 78 to provide turning, extension and retraction movements of the drilling bits 711, 712, such are well known in the related art and thus, a detailed description will not be provided.

Referring again to FIG. 6, in order to prevent the dust which results due to the drilling operation and from falling into the interior of the lower casing 12, a shielding cover 71 can be provided so as to cover the radial groove 14. The shielding cover 71 has a slit 351 to permit sliding movement of the movable piece 3 in the radial groove 14.

Since the clamping and drilling device of the present invention can clamp and drill a curved plate regardless of its width and radius of curvature, only one clamping and drilling device is required even through drilling operations are to be performed on different curved plates. The manufacturing cost is therefore, reduced correspondingly.

While a preferred embodiment has been described and illustrated, it will be apparent that many changes and modifications can be made in the general construction and arrangement of the present invention without departing from the scope and spirit thereof. Therefore, it is desired that the present invention be not limited to the exact disclosure but only to the extent of the appended claims.

I claim:

1. A clamping and drilling device for a curved plate that has a radius of curvature and a width, said device comprising:
    a machine body;
    an indexing apparatus mounted on said machine body, said indexing apparatus having an index plate mounted rotatably thereon;
    a clamping assembly including an upright post that has a lower end fixed to said index plate, a pivot seat fixed on said upright post between said index plate and a top end of said upright post, a first engaging unit and upper and lower circular hollow casings mounted coaxially to said upright post, each of said hollow casings having a covering plate spaced from the other one of said covering plates, said lower circular hollow casing being attached securely to said index plate, said upper circular hollow casing having a second engaging unit, a threaded hole which extends vertically through said second engaging unit, and a threaded shaft which is threaded into said threaded hole, said threaded shaft having a lower end journalled to said pivot seat parallel to said upright post, thereby retaining said upper hollow casing on said upright post at a desired height relative to said lower casing which is equal to said width of said curved plate, said second engaging unit engaging said first engaging unit so as to prevent said upper hollow casing from rotating relative to said upright post and so as to permit said upper hollow casing to move axially along said upright post;
    each of said upper and lower casings having an abutting plate which is fixed perpendicularly on a respective one of said covering plates and which extends radially thereon, a radial groove and an elongated movable piece provided slidably in a respective said radial groove, each of said elongated movable pieces having two clamping units, each of said upper and lower casings further having a driving means for moving said two clamping units relative to one another;
    a control member for actuating said driving means synchronously;
    means for synchronously moving said elongated movable pieces along said radial grooves of said lower and upper casings so as to define a distance between said elongated movable pieces and said upright post, said distance being equal to said radius of curvature of said curved plate; and
    a drilling assembly provided on said machine body, said drilling assembly including an upright holding member with a first drilling bit extending toward an axis of said upright post, a second drilling bit which is disposed right below said first drilling bit in a parallel manner and which extends toward said axis of said upright post, and means for adjusting a vertical height between said first and second drilling bits.

2. The clamping and drilling device as defined in claim 1, wherein each of said clamping units includes a curved face support mounted on one end of said elongated movable piece adjacent to said upright post and a circular disc that has a center point pivoted to said movable piece between said curved face support and a second end of said movable piece, said circular disc having a circumferential cut-out along a periphery thereof, thereby defining a radial edge that is adjacent to said curved face support and a peripheral notch that is spaced from said radial edge by a given angular distance; and
    said driving means including a pneumatic cylinder and a piston rod that has a front end pivoted to said peripheral notch of said circular disc and a rear end connected to said pneumatic cylinder.

3. The clamping and drilling device as defined in claim 1, wherein said upright holding member includes a vertical guiding channel, said vertical height adjusting means including two retaining pieces provided slidably in said vertical guiding channel, first and second worm wheels which have teeth that are oriented in opposite directions and which are connected respectively to said retaining pieces, and a worm extending through said upright holding member adjacent to said vertical guiding channel, said worm being meshed with said first and second worm wheels, said first worm wheel rotating in an opposite direction with respect to said second worm wheel when said worm is rotated.

4. The clamping and drilling device as define in claim 1, wherein said synchronous moving means includes:
    an annular rotary plated mounted in each of said upper and lower circular hollow casings, each of said annular rotary plates being mounted coaxially to said upright post, each of said annular rotary plates having a threaded portion formed at an inner periphery thereof and a helical groove formed on a surface adjacent to each of said covering plates of said upper and lower casings;

a gear wheel provided in each of said upper and lower circular hollow casings and meshed with said threaded portion of a respective said annular rotary plate;

a toothed portion being formed on each of said elongated movable pieces and extending into said upper and lower casings through said respective covering plate, said tooth portions being meshed respectively with said helical grooves of said movable pieces; and a telescopic connecting rod which has two ends respectively extending into said upper and lower casings to connect securely with said gear wheels;

whereby, axial rotation of said telescopic connecting rod causes said elongated movable pieces to slide along said radial grooves.

* * * * *